(12) United States Patent
Escabi, II et al.

(10) Patent No.: US 7,266,655 B1
(45) Date of Patent: Sep. 4, 2007

(54) SYNTHESIZED BACKUP SET CATALOG

(75) Inventors: Zeir R. Escabi, II, Lake Mary, FL (US); Ynn-Pyng A. Tsaur, Oviedo, FL (US)

(73) Assignee: Veritas Operating Corporation, Mountain View, CA (US)

( * ) Notice: Subject to any disclaimer, the term of this patent is extended or adjusted under 35 U.S.C. 154(b) by 537 days.

(21) Appl. No.: 10/834,446

(22) Filed: Apr. 29, 2004

(51) Int. Cl.
*G06F 12/16* (2006.01)
(52) U.S. Cl. ............................ 711/162; 707/204
(58) Field of Classification Search ................ 711/162; 707/204
See application file for complete search history.

(56) References Cited

U.S. PATENT DOCUMENTS

| | | | |
|---|---|---|---|
| 5,485,606 A | 1/1996 | Midgdey et al. | 707/10 |
| 5,819,296 A | 10/1998 | Anderson et al. | 707/204 |
| 5,926,836 A | 7/1999 | Blumenau | 711/162 |
| 6,185,621 B1 | 2/2001 | Romine | 709/231 |
| 6,353,878 B1 | 3/2002 | Dunham | 711/162 |
| 6,434,681 B1 | 8/2002 | Armangau | 711/162 |
| 6,477,628 B1 | 11/2002 | Bish et al. | 711/162 |
| 6,675,257 B1 | 1/2004 | Khalid et al. | 711/111 |
| 2002/0095537 A1 | 7/2002 | Slater | |
| 2002/0103982 A1 | 8/2002 | Ballad et al. | |
| 2004/0030852 A1* | 2/2004 | Coombs et al. | 711/162 |
| 2004/0044830 A1 | 3/2004 | Gibble et al. | |
| 2004/0044854 A1 | 3/2004 | Gibble et al. | |

OTHER PUBLICATIONS

Hellman, D.J. et al., "Innovations in Tape Storage Automation at IBM," Jul. 2003; IBM Journal of Research and Development, vol. 47; No. 4; pp. 445-452.

Escabi II, Zier R., Pending U.S. Patent Application entitled "Backup Set Copy," U.S. Appl. No. 10/715,937, filed Nov. 18, 2003, including Specification: pp. 1-17; Drawings: Figures 1-7 on 7 sheets.

Escabi II, Zier R., Pending U.S. Patent Application entitled "Catalog-Driven Backups," U.S. Appl. No. 11/091,301, filed Mar. 28, 2005, including Specification: pp. 1-23; Drawings: Figures 1-6 on 4 sheets.

Escabi II, Zier R., Pending U.S. Patent Application entitled "Method and Apparatus for Providing Parallel Backup Set Processing for Creating a Synthetic Backup," U.S. Appl. No. 11/395,040, filed Mar. 31, 2006, including Specification: pp. 1-24, Drawings: Figures 1-9 on 7 sheets.

Sridharan, Srineet, et al., Pending U.S. Application entitled "Catalog Driven Restore," U.S. Appl. No. 11/395,916, filed Mar. 31, 2006, including Specification: pp. 1-25; Drawings: Figures 1-8 on 6 sheets.

\* cited by examiner

*Primary Examiner*—Jack A. Lane
(74) *Attorney, Agent, or Firm*—Campbell Stephenson LLP

(57) ABSTRACT

Synthesized backup set catalogs are created to more efficiently create synthetic full backups of a data volume or to more efficiently restore a data object of the data volume. In one embodiment, the synthesized backup set catalog comprises n entries corresponding to n data objects, respectively, of a data volume being backed up. The synthesized backup set catalog can be created with the creation of an incremental backup of the data volume. Each entry of the synthesized backup set catalog may contain a backup identification (ID), wherein each backup ID identifies at least one of two backup sets of the data volume.

12 Claims, 4 Drawing Sheets

| Entry | File ID | File Offset | Backup Set ID |
|---|---|---|---|
| 1 | File 1 | A11 | 1 |
| 2 | File 2 | A12 | 1 |
| 3 | File 3 | A13 | 1 |
| 4 | File 4 | A14 | 1 |
| ⋮ | | | |
| n | File n | A1n | 1 |

116(1)

| Entry | File ID | File Offset | Backup Set ID |
|---|---|---|---|
| 1 | File 1 | A11 | 1 |
| 2 | File 2 | A21 | 2 |
| 3 | File 3 | A13 | 1 |
| 4 | File 4 | A14 | 1 |
| ⋮ | | | |
| n | File n | A1n | 1 |

116(2)

| Entry | File ID | File Offset | Backup Set ID |
|---|---|---|---|
| 1 | File 1 | A31 | 3 |
| 2 | File 2 | A21 | 2 |
| 3 | File 3 | A13 | 1 |
| 4 | File 4 | Am1 | m |
| ⋮ | | | |
| n | File n | A1n | 1 |

116(m)

| Entry | File ID | File Offset | Backup Set ID |
|---|---|---|---|
| 1 | File 1 | B11 | S |
| 2 | File 2 | B12 | S |
| 3 | File 3 | B13 | S |
| 4 | File 4 | B14 | S |
| ⋮ | | | |
| n | File n | B1n | S |

120

SYNTHESIZED BACKUP SET CATALOG

BACKGROUND OF THE INVENTION

Businesses and other entities store data objects (e.g., image files, text files, computer software, database data, directories and the like) on memory devices such as hard disks. But hard disks fail at the worst times and take all the data objects stored on them with them when they go. Thus was born the concept of creating backups of the data objects on separate recording media (e.g. magnetic tapes). For purposes of description only, the term "data objects" will be understood to mean files, it being understood that the term should not be limited thereto. The following description will be made with reference to backing up a data volume consisting of n files, it being understood that the present invention should not be limited thereto.

Backups protect against hardware failures, software failures, and user errors. Hardware failures can range from the failure of a single hard disk to the destruction of an entire data center, making some or all files of the data volume unrecoverable. Software failures are bugs or procedural errors in, for example, a server application that corrupts the contents of data files. User errors include errors such as inadvertent deletion or overwriting of files that are later required. In these cases, destroyed files generally impact the ability of a user or set of users to function.

Mirroring and replication technology can be configured to provide good protection against hardware failures. But these technologies will also write data corrupted by application errors every bit as reliably as they write correct data, and they faithfully record the file system or database metadata updates that result from a user's mistaken deletion of an important file on all mirrors or replicas. Because they are optimized to serve different purposes, mirroring and replication technologies have different goals than backup. Mirroring and replication attempt to preserve the bit-for-bit state of files as they change, while backup attempts to preserve the state of the files as of some past point-in-time at which the files of the data volume were known to be consistent. Mirrors or replicas keep the contents of all replicated devices or files identical to each other. Backup however, does something quite different: it captures an image of the data volume at an instant in the past, so that if need be, everything that has happened to the data volume since that instant can be forgotten, and the state of operations can be restored to that instant.

Backups are typically created during late hours of the night. "Backup windows" are time intervals during which a computer is unoccupied by other tasks and therefore available for making backups of the data volume. Backup windows have been shrinking to accommodate increasing reliance on computers. With round-the-clock transaction processing (so credit cards will be honored at late night diners), the windows continue to shrink to essentially nothing.

Backup operations create backup sets (i.e., copies of one or more files of the data volume) that may be either full or incremental. A full backup set means that all of the files in the data volume are copied, regardless of how recently they have been modified or whether a previous backup set exists. An incremental backup means that only files of the data volume that have changed since some previous event (e.g., a prior full backup or incremental backup) are copied. The backup window for a full backup tends to be much larger when compared to the backup window for an incremental backup. For most applications, incremental backup is preferable at backup time since, in most cases, the number of files of the data volume that change between backups is very small compared to the number of files in the entire data volume and since the backup window is small. If backups are done daily or even more frequently, it is not uncommon for less than 1% of files to change between backups. An incremental backup in this case copies 1% of the data that a full backup would copy and uses 1% of the input/output (IO) resources. Incremental backup appears to be the preferred mode to guarding data. And so it is, until a full restore of all the files of the data volume is required. A full restore from incremental backups entails starting with the restore of the newest full backup copy, followed by restores of all newer incremental backups. That can require a lot of media handling-time performed by, for example, an automated robotic handler. Thus, restore from full backups is generally simpler and more reliable than restore from combinations of full and incremental backups. For recovering from individual user errors, the situation is just the opposite. Users tend to work with one small set of files for a period of days or weeks and then work with a different set. Accordingly, there is a high probability that a file destroyed by a user will have been used recently and therefore will be copied in one of the incremental backup operations. Since incremental backups contain a smaller fraction of data than a full backup, they can usually be searched much faster if a restore is required. The ideal from the individual user's standpoint is therefore many small incremental backups. Some backup systems offer a compromise: the ability to consolidate a baseline full backup and several incremental backups into a new, more up to data full backup, which becomes the baseline for further incremental backups. While costly in terms of the time needed to create them, these synthetic full backups simplify a restoration process.

FIG. 1 illustrates in block diagram form, relevant components of a data processing system 10 which employs an exemplary backup and restore technology. FIG. 1 shows an application server 12 coupled to a data storage subsystem 14 via storage interconnect 16. Data storage subsystem 14 may include several physical storage devices. For purposes of explanation, the physical storage devices of storage subsystem 14 will take form in hard disks, it being understood that the term "physical storage device" should not be limited to hard disks. Further, for purposes of explanation, data storage subsystem 14 will take form in a disk array, it being understood that the term "data storage subsystem" should not be limited thereto. As will be more fully described below, disk array 14 contains an exemplary data volume VE of n files (file 1-file n).

FIG. 1 further includes a backup server coupled to data storage subsystem 22 via storage interconnect 24. For purposes of explanation, data storage subsystem 22 will take form in a robotic tape handler having access to several magnetic tapes. Lastly, application server 12 and backup server 18 are coupled to each other via local area network (LAN) 26. LAN 26 transmits backup data from its source (e.g., disk array 14) to its target (e.g., robotic tape handler 22), or LAN 26 transmits the restoration data from its source (e.g. robotic tape handler 22) to its target (e.g., disk array 14).

FIGS. 2 and 3 illustrate relevant aspects of creating full, incremental and synthetic full backup sets of exemplary data volume VE. FIG. 2 represents disks and tapes that store data volume VE and backup sets thereof. More particularly, FIG. 2 shows data volume VE stored within a disk 30. It is noted that disk 30 may be implemented as a virtual disk or, in other words, a logical aggregation of physical hard disks within disk array 14. Backup server 18 creates a full backup data set 1 of volume VE on tape 32(1) while incremental backup sets 2-m are created on tapes 32(2)-32(m), respectively. A synthetic full backup set is created on tape 34 from files copied from some or all of the backup sets 1-m. All tapes 32(1)-32(m) and 34 are accessible by robotic tape handler 22.

FIG. 3 shows backup catalogs 36(1)-36(m) and 40. Catalogs 36(1)-36(m) and 40 are created by backup server 18 with the creation of backup sets 1-m and the synthetic full backup set, respectively. Catalogs 36(1)-36(m) and 40 identify the files copied to the backup sets 1-m and the synthetic full backup set, respectively. Additionally, catalogs 36(1)-36(m) and 40 directly or indirectly identify locations in tapes 32(1)-32(m) and 34, respectively, where backed up files can be found. All catalogs are stored in cache memory (not shown) of backup server 18. The backup sets and their respective catalogs including their uses are more fully described below.

The full backup set 1 is created by copying each file of data volume VE to tape 32(1) during a backup window. When the backup server 18 creates the full backup set 1, backup server 18 also creates catalog 36(1) listing the files copied to tape 32(1). As shown in FIG. 3, catalog 36(1) includes n entries corresponding to the n files, respectively, of volume VE. Each entry contains a file identification (file ID) and a file offset. The file ID, as its name implies, identifies a file backed up to tape 32(1), and the file offset identifies an offset from a starting address in tape 32(1) where the corresponding file can be found.

With the next scheduled backup window, backup server 18 creates incremental backup set 2 of data volume VE. More particularly, backup server 18 stores on tape 32(2), a copy of all files within data volume VE that were modified (e.g., written) since the creation of full backup set 1. There are many ways to identify files that have been modified since the creation of the full backup set 1. For example, each file of volume VE may have an associated meta data field that indicates the time when the file was last written or modified. During the incremental backup, these meta data time fields are traversed and the time stamps in them are compared to the time when the last backup was performed. If the time stamp in the meta data field is later than the time when the last backup was performed, the corresponding file is deemed modified and subject to backup.

In addition to creating the incremental backup set 2 on tape 32(2), backup server 18 creates catalog 36(2) shown within FIG. 3. Catalog 36(2) identifies only the files contained within the incremental backup set 2. Indeed, all catalogs associated with the incremental backup sets contain only information on files contained within the respective incremental backup sets. Catalog 36(2) includes an entry for each file copied to tape 32(2). Like catalog 36(1), each entry of catalog 36(2) identifies a respective file and its corresponding offset from a starting address within tape 32(2). Using the offset and the starting address, the physical address of each file backed up to tape 32(2) can be calculated.

Backup server 18 may create m−1 incremental backup sets of data volume VE. FIG. 2 illustrates the last incremental backup set m created by backup server 18 on tape 32(m) before creation of the synthetic full backup. FIG. 3 shows catalog 36(m) associated with incremental backup set m. The entries for catalog 36(m) are similar in format to those of catalogs 36(1)-36(m−1).

Backup server 18 can create the synthetic full backup of volume VE using one or more of the backup sets 1-m. The synthetic full backup is created by combining files residing in multiple prior backup sets into a backup set (i.e., the synthetic backup set) that contains the most recent version of each file of volume VE. Tape 34 shown in FIG. 2 is configured to store the synthetic full backup set created by backup server 18. It is noted that in an alternative embodiment, the full backup set and synthetic full backup set may be preferably created on disks (not shown) coupled to backup server 18. Disks are preferable since read access to hard disks is quicker during a restoration operation than read access to tape contained within robotic tape handler 22. For purposes of explanation, it will be presumed that backup sets are stored on magnetic tape media, it being understood that the present invention should not be limited thereto.

The contents of the catalogs 36(1)-36(m) determine which files of the backup sets 1-m are to be combined to create the synthetic full backup. Once the necessary files are identified, their location, with regard to which tapes 32(1)-32(m), must determined by processing the catalogs 36(1)-36(m). It is noted that during the creation of the full or incremental backup sets, one or more files of data volume VE may have been deleted or added. However, for sake of description simplicity, it will be presumed that no files are added to or deleted from volume VE during the backup processes described above.

FIG. 4 illustrates relevant operational aspects of one embodiment for creating a synthetic full backup set using catalogs 36(1)-36(m) and backup sets 1-m. A file (file x) of volume VE to be backed up is identified. The backup server then sets variable y to m+1 and decrements y by 1 as shown in steps 54 and 56. Backup server 18 then begins a search for the most recent version of file x contained within backup sets 1-m. More particularly, backup server 18 accesses catalog 36(y) to determine whether file x is contained within incremental backup set y. It is noted that backup server 18 starts with catalog 36(y=m) because it corresponds to the most recently created incremental backup. If catalog 36(y) indicates that file x is contained within incremental backup set y, then the process proceeds to 62 where backup server 18 copies file x from tape 32(y) to tape 34. The physical address in tape 32(y) of file x is calculated as a function of the file offset contained in catalog 36(y).

If, however, in step 60, catalog 36(y) indicates that file x is not contained in incremental backup set y then the process proceeds to step 70 where backup server 18 determines whether incremental backup set y is the first incremental created after full backup set 1. If it is, then file x contained in full backup set 1 is copied from tape 32(1) to tape 34 as shown in step 72. Backup server 18 can determine whether incremental backup set y is the first incremental created after full backup set 1 by comparing the current state of variable y to 2. If y equals 2, then incremental backup set y is the first incremental created after full backup set 1 and the process proceeds to step 72. If y does not equal 2, then incremental backup set y is not the first incremental created after full backup set 1, and the process proceeds to steps 56 and 60 where y is decremented and catalog 36(y) is checked for file x. Eventually, the most recent version of file x is found and copied to tape 34 in step 62 or 72.

In creating the synthetic full backup set 34, backup server 18 also creates a corresponding catalog 40 shown within FIG. 3. Like catalogs 36(1)-36(m), catalog 40 includes entries, each of which identifies a respective file and its corresponding offset from a starting address within tape 34. In step 64, backup server 18 creates entry x in catalog 40 corresponding to the file x copied in step 62 or step 72. Thereafter, steps 54-64 are repeated for the next file of the data volume VE. After all of the most recent versions of files 1-n have been copied to tape 34, the process has completed.

FIG. 4 shows that at a substantial amount of processing is needed for backup server 18 to create the synthetic full backup set on tape 34. It can also be seen that a substantial amount of backup server 18 processing time may be needed to identify the location within backup sets 1-m of the most recent version of any particular file when that particular file needs to be restored to volume VE.

SUMMARY OF THE INVENTION

Synthesized backup set catalogs are created to more efficiently create synthetic full backups of a data volume or to more efficiently restore a data object of the data volume. In one embodiment, the synthesized backup set catalog comprises n entries corresponding to n data objects, respectively, of a data volume being backed up. The synthesized backup set catalog can be created with the creation of an incremental backup of the data volume. Each entry of the synthesized backup set catalog may contain a backup identification (ID), wherein each backup ID identifies at least one of two backup sets of the data volume.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention relates to the creation and/or use of synthetic backup catalogs (hereinafter synthetic catalogs). These synthetic catalogs can be used to more efficiently create synthetic full backup sets when compared to the method described in the background section above. Moreover, synthetic catalogs can be used to more efficiently restore a file of a data volume.

Figure 1:
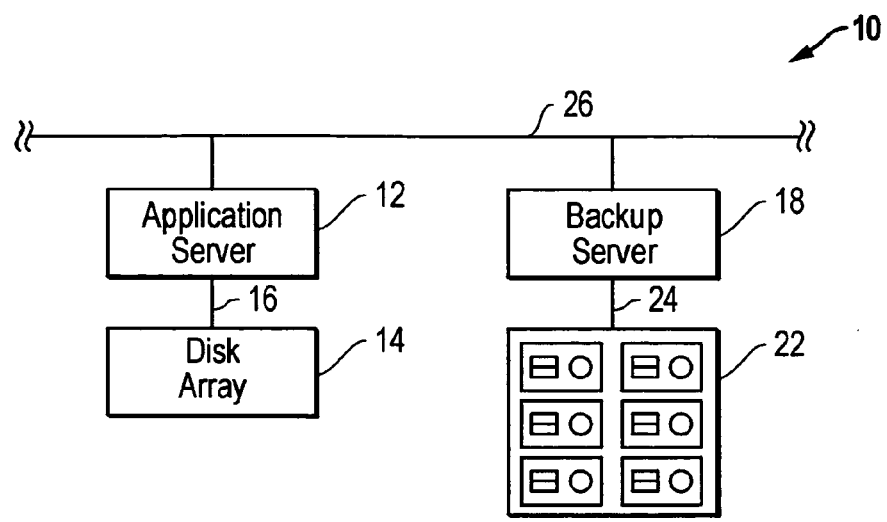
FIG. 1 illustrates a data processing system.
Figure 2:
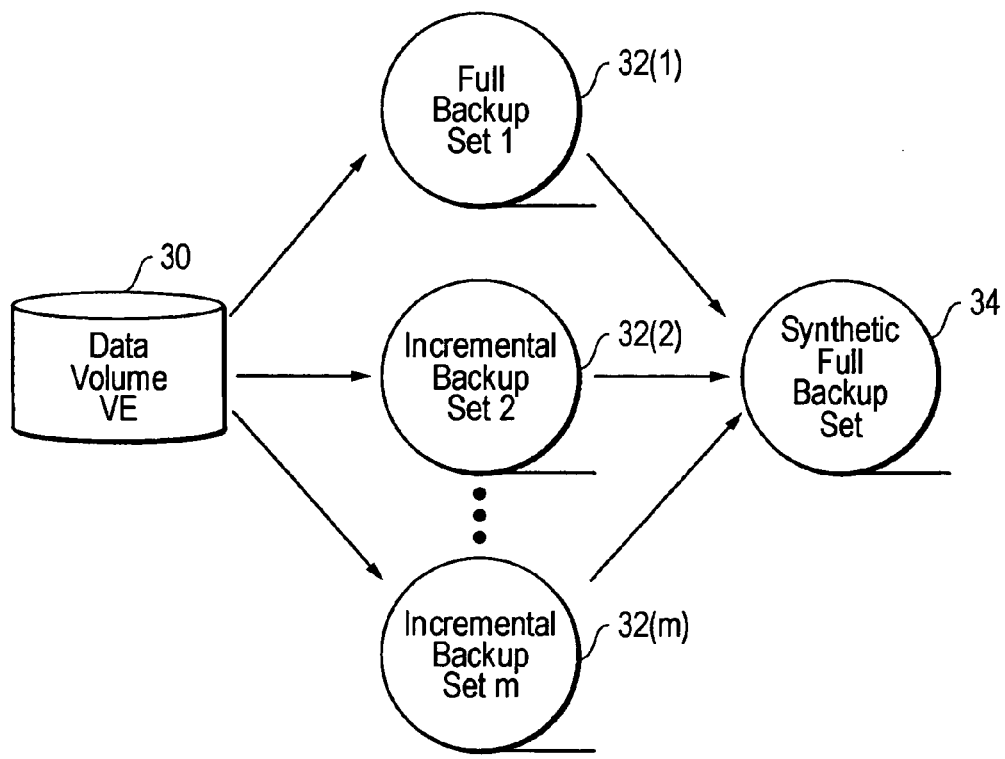
FIG. 2 illustrates relevant aspects of creating backup sets of a data volume stored in the data processing system of FIG. 1.
Figure 3:
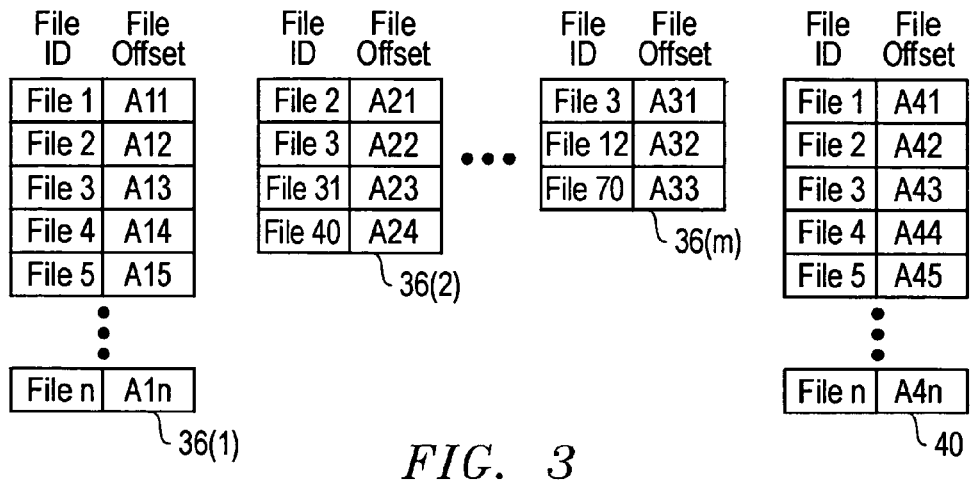
FIG. 3 illustrates catalogs that list the contents of backup sets in FIG. 2.
Figure 4:
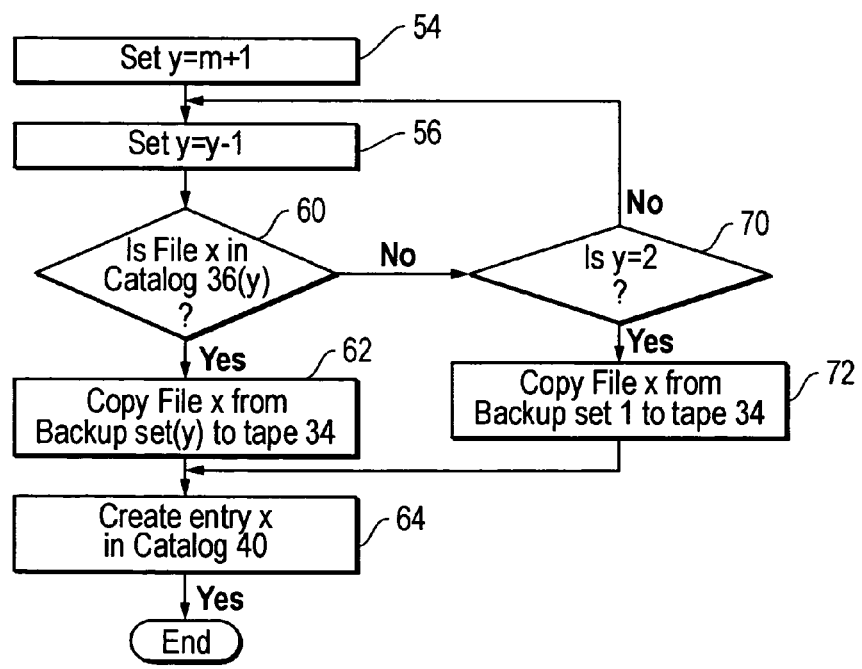
FIG. 4 illustrates relevant aspects creating a synthetic full backup set using the catalogs shown in FIG. 3.
Figure 5:
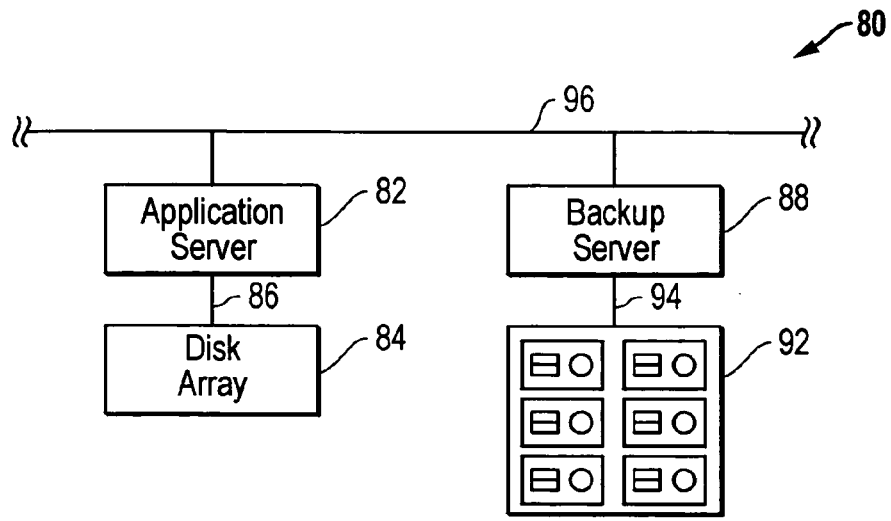
FIG. 5 illustrates a data processing system employing one embodiment of the present invention.

FIG. 5 illustrates in block diagram form, a relevant components of a data processing system 80 employing one embodiment of the present invention. It should be clearly understood that the present invention should not be limited to use within the data processing system 80 shown in FIG. 5. Rather, the present invention can be employed in many different types of data processing systems including those that are more or less complex than that shown within FIG. 5.

FIG. 5 shows an application server 82 coupled to a data storage subsystem 84 via storage interconnect 86. Data storage subsystem 84 may include several physical storage devices. For purposes of explanation, the physical storage devices of storage subsystem 84 will take form in hard disks. Further, for purposes of explanation, data storage subsystem 84 will take form in a disk array. As will be more fully described below, disk array 84 stores an exemplary data volume V of n files (file 1-file n).

Application server 82 executes an application which generates transactions to read or write data to files of volume V in accordance with requests received from client computer systems (not shown) coupled thereto. IO transactions are transmitted by application server 82 to disk array 84 via storage interconnect 86. Data read from files of volume V is transmitted by storage interconnect 86 from disk array 84 to application server 82.

FIG. 5 further includes a backup server 88 coupled to data storage subsystem 92 via storage interconnect 94. Backup server 88 executes a backup/restore system for backing up or restoring files of volume V. For purposes of explanation, data storage subsystem 92 will take form in a robotic tape handler having access to several magnetic tapes for storing full, incremental, and synthetic full backup data sets. In an alternative embodiment, full, incremental or synthetic full backup sets may be created on one or more hard disks (not shown) coupled to backup server 88. However, for purposes of explanation, it will be presumed that all backup sets are created on tapes accessible by tape handler 92. Lastly, application server 82 and backup server 88 are coupled to each other via local area network (LAN) 96. LAN 96 transmits backup data from its source (e.g., disk array 84) to its target (e.g., robotic tape handler 92), or LAN 96 transmits restoration data from its source (e.g. robotic tape handler 92) to its target (e.g., disk array 84).

Backup server 88 can create full, incremental, or synthetic full backup sets of data volume V. The present invention will be described with the creation of one full backup set, m−1 incremental backup sets, and a synthetic full backup set, it being understood that the present invention should not be limited thereto. Two or more backup sets may be created and stored on a single tape accessible by robotic handler, or one backup set can be stored on two or more tapes accessible by robotic tape handler. For purposes of explanation only, each backup set, regardless of whether it is a full, incremental, or synthetic full backup, is created and stored on a separate tape accessible by robotic tape handler 92. Backup server 88 may also create a synthesized catalog for each of the backup sets. In one alternative embodiment backup server 88 may create synthesized catalogs only for the incremental backup sets, however, the present invention will be described with server 88 creating a synthesized catalog for each backup set.

Figure 6:
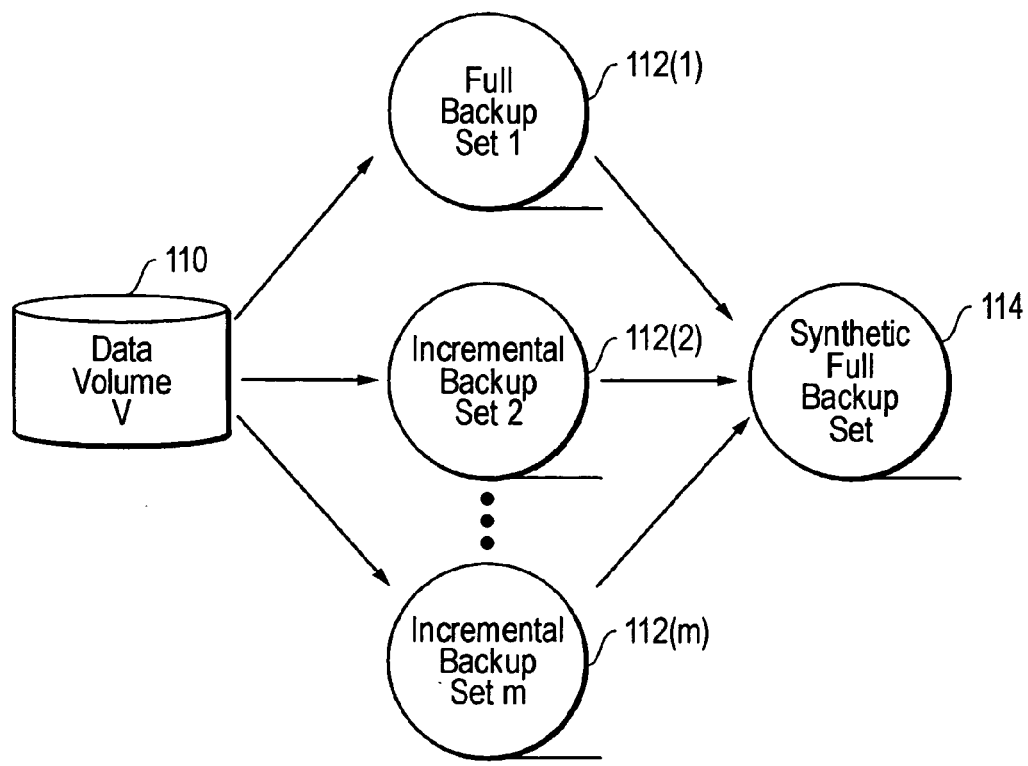
FIG. 6 illustrates relevant aspects of creating backup sets of a data volume stored in the data processing system of FIG. 5.
Figures 7, 8:
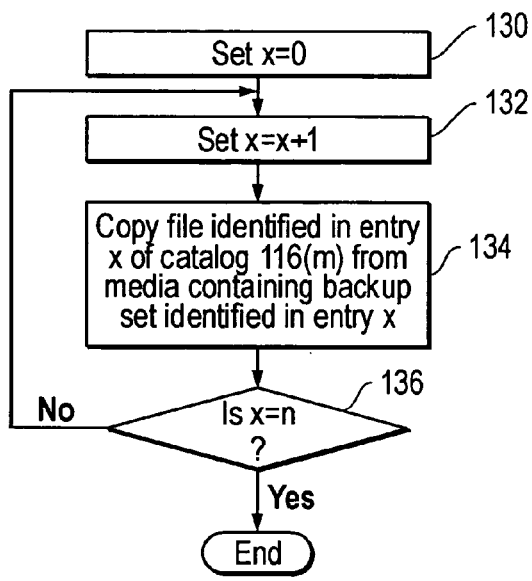
FIG. 7 illustrates one embodiment of catalogs created by the backup server shown in FIG. 5.
FIG. 8 illustrates relevant aspects creating a synthetic full backup set using a catalog shown in FIG. 7.

FIGS. 6 and 7 illustrate relevant aspects of creating full, incremental and synthetic full backup sets of data volume V and corresponding synthesized catalogs. FIG. 6 illustrates a disk and several tapes that store data volume V and backup sets thereof. More particularly, FIG. 6 shows a disk 110 that stores a data volume V. It is noted that disk 110 may be implemented as a virtual disk or, in other words, a logical aggregation of physical hard disks within disk array 84. Backup server 88 creates a full backup data set 1 of volume V on tape 112(1), incremental backup sets 2-m on tapes 112(2)-112(m), respectively, and a synthetic full backup data set on tape 114. A synthetic full backup set can be created on tape 114 from files backed up to some or all of the backup sets 1-$m$. All tapes 112(1)-112($m$) and 114 are accessible by robotic tape handler 92.

FIG. 7 illustrates synthesized catalogs created by backup server 88 for the backup sets shown within FIG. 6 according to one embodiment. More particularly, FIG. 7 shows synthesized catalog 116(1) corresponding to the full backup set 1 created on tape 112(1), synthesized catalog 116(2) corresponding to the incremental backup set 2 created on tape 112(2), synthesized catalog 116($m$) corresponding to incremental backup set m created on tape 112($m$), and synthesized catalog 120 corresponding to the synthetic full backup set created on tape 114. These synthesized catalogs can be stored and accessed in a cache memory (not shown) in backup server 88. Additionally, each synthesized catalog can be stored on tape with the catalog's associated backup set.

In the illustrated embodiment, each of the synthesized catalogs 116(1)-116($m$) and 120 includes n entries corresponding to the n files of data volume V. This detailed description presumes that no files are added to or deleted from volume V subsequent to creation of the full backup set copy on tape 112(1), it being understood that the present invention should not be limited thereto. Indeed, the present invention can be easily implemented by one of ordinary skill in the art to accommodate the addition or deletion of files from data volume V after creation of any backup set.

As noted, each synthesized catalog contains n entries corresponding to the n files, respectively of volume V. Each entry within the exemplary synthesized catalogs shown within FIG. 7 includes three items: a file ID identifying one of the files of volume V, a file offset, and a backup set ID. The file offset and backup set ID can be used to generate the physical address where the file, identified by the file ID, is backed up on tape. More particularly, file x identified by the file ID of an entry is stored on a tape y as part of the backup set z identified by the backup set ID. In one embodiment, a lookup table can be used to map the backup set z to tape y. The physical address of file x on tape y can be calculated by adding the offset Aqn of the entry to a starting address of the tape y.

Full backup set 1 is created by copying each file of data volume V to tape 112(1) during a backup window. Backup server 88 also creates synthetic catalog 116(1). As shown in FIG. 7, catalog 116(1) includes n entries corresponding to the n files, respectively, of volume V copied to tape 112(1). Each entry contains a file ID, a file offset, and a backup set ID. The file ID, as its name implies, identifies a file backed up to tape 112(1), and the file offset identifies an offset from a starting address in tape 112(1) where the corresponding file can be found. Given that catalog 116(1) corresponds to the initial full backup set 1 of data volume V, all backup set IDs of this catalog are set to 1 thus indicating that the most recent copies of files 1-$n$ existing at that time, reside within backup set 1 contained within tape 112(1).

Backup server 88 creates synthetic catalog 116(2) when incremental backup set 2 is created on tape 112(2). For purposes of explanation, it will be presumed that only file 2 was modified since the creation of the full backup set 1. Accordingly, only file 2 is copied from data volume V to tape 112(2) to create incremental backup set 2.

Information from a previously created synthesized catalog is carried forward or copied to create the newest synthesized catalog. For example, synthetic catalog 116(2) may be created by copying the contents of synthetic catalog 116(1) and then overwriting entry 2 with the new entry 2 shown in catalog 116(2). This new entry 2 has a backup set ID equal to 2 thereby indicating that the latest version of file 2 can be found within backup set 2 on tape 112(2). This entry also A21 the offset from a starting address on tape 112(2) where corresponding file 2 can be found. The remaining entries of catalog 116(2) identify that backup set 1 contains the most recent version of the remaining files (e.g., file1 and files 3-$n$) of volume V. As an aside, if files such as file 1 and 2 are accidentally deleted from volume V by user error before creation of incremental backup set 3, only synthesized catalog 116(2) need be accessed to determine where the most recent version of files 1 and 2 can be found. Thus, catalog 116(2) indicates that the most recent copy of file 1 can be found within the backup set 1 in tape 112(1) at offset A11, and that the most copy of file 2 can be found within the backup set 2 in tape 112(2) at offset A21.

Subsequent incremental backup sets of volume V may be created after creation of incremental backup set 2. For purposes of explanation, m-1 incremental backup sets are created after creation of incremental backup set 2. As noted, a synthesized catalog is created for each of the subsequent incremental backup sets. Thus, when incremental backup set m is created on tape 112($m$), synthesized catalog 116($m$) is created. In creating synthesized catalog 116($m$), backup server 88 copies the contents of previously created synthesized catalog 116($m$-1) (not shown) and overwrites all entries except for those corresponding to files of volume V which have not been modified since the creation of incremental backup set m-1. In other words, backup server 88 overwrites entries in synthesized catalog 116($m$) corresponding to those files of volume V which have been modified since creation of the prior incremental backup set m-1 and which have been backed up to tape 112($m$). In the illustrated example, only file 4 of volume V has been modified since creation of the prior incremental backup set m-1. Accordingly, the entries of catalog 116($m$) are identical to respective entries of catalog 116($m$-1) except for entry 4 which indicates that the most recent version of file 4 can be found within backup set m on tape 112($m$) at offset Am1.

Backup server 118 may create a synthetic full backup copy of volume V from the full backup set 1 and/or one or more of the incremental backup sets 2-$m$. FIG. 8 illustrates relevant operational aspects performed by backup server 88 in creating the incremental full backup set according to one embodiment. More particularly, the process shown in FIG. 8 begins with steps 130 and 132 where backup server 88 sets variable x to 0 and subsequently increments variable x by 1. Thereafter, in step 134 backup server 88 accesses the most recently created synthesized catalog (i.e., synthesized catalog 116($m$)) to identify the location of the file identified in entry x. In one embodiment, the most recently created synthesized catalog is stored in an easily accessible cache memory of backup server 88. In step 134 backup server 88 accesses the tape which contains the backup set identified by the backup set ID of entry x of synthesized catalog 116($m$) and copies the contents of this file to tape 114. The file identified in entry x is accessed at a physical address in the tape that contains the backup set identified by the backup set ID of entry x, and the physical address is calculated from the starting address of the tape and the offset address identified by entry x of synthesized catalog 116($m$). This process is repeated for each of the files of volume V. In step 136, x is compared to n, and if x equals n then all files have been copied to tape 114. If x does not equal n, then the process repeats beginning with step 136 where x is incremented. It is noted that in contrast to that described in the background, the process of FIG. 8 accesses only one synthesized catalog to learn the location within the backup sets of all files needed to create the synthetic full backup. This reduces the processing requirements on backup server 88 when creating a synthetic full backup.

As shown above, the synthetic full backup is created by copying the most recent backup copies of volume V files from the full backup set 1 and/or one or more of the incremental backup sets 2-*m* to tape 114. Synthetic catalog 112(*m*) is the last synthetic catalog created before creation of the synthetic full backup. The entries of catalog 112(*m*) includes the backup sets (and indirectly their respective tapes) that store the most recent copies of files 1-*n*. The entries of catalog 112(*m*) also include the offsets from the starting address in the tapes where the most recent copies of files 1-*n* can be found. In the process shown in FIG. 8, there is no need to access a synthesized catalog other than catalog 112(*m*) when creating the synthetic full backup. The synthetic catalogs should not be limited to that shown in FIG. 7.

In an alternative embodiment, synthetic catalogs can be created with one or more entries that include a file ID, a file offset, and a backup set ID, and with one or more entries that include a file ID and an entry number for a previous catalog that contains a file offset and a backup set ID. Backup server 88 can use these alternative synthetic catalogs and the process shown in FIG. 8 to create a synthetic full backup. The process in FIG. 8 begins with steps 130 and 132 where backup server 88 sets variable x to 0 and subsequently increments variable x by 1. Thereafter, in step 134 backup server 88 accesses entry x in the most recently created alternative synthetic catalog to identify the location of the file identified therein. If entry x contains a file offset and a backup set ID, then in step 134 backup server 88 accesses the tape which contains the backup set identified by the backup set ID of entry x and copies the file identified by entry x to tape 114. The file identified in entry x is accessed at a physical address calculated from the starting address of the tape and the offset address identified by entry x of the synthesized catalog. On the other hand, if entry x contains an entry number ce for a previously created synthetic catalog, then backup server accesses the previously created synthetic catalog at entry ce. Entry ce will contain a file offset and backup set ID for the file identified by entry x. Backup server 88 accesses the tape which contains the backup set identified by the backup set ID of entry ce and copies the file sought to tape 114. The file identified in entry ce is accessed at a physical address calculated from the starting address of the tape and the offset address identified by entry ce of the previously created synthesized catalog. This process is repeated for each of the files of volume V. In step 136, x is compared to n, and if x equals n then all files have been copied to tape 114. If x does not equal n, then the process repeats beginning with step 136 where x is incremented. It is noted that in contrast to process described for creating a synthetic fill backup using synthetic catalog 112(*m*), the process for creating the synthetic full backup using the alternative synthetic catalogs, uses two or more alternative catalogs. However, like the synthetic catalogs shown in FIG. 7, one or more entries are carried forward from one catalog to its successor. For example, an entry that contains file ID and an entry to a previously created synthetic catalog, is copied to a subsequently created synthetic catalog.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   creating a first backup of a data volume, wherein the data volume comprises first and second data objects;
   modifying the first and second data objects in the data volume subsequent to the creation of the first backup;
   creating a second backup of the data volume after the modification of the second data object but before the modification of the first data object;
   creating a catalog after the modification of the second data object but before the modification of the first data object, wherein the catalog contains information indicating that backup copies of the first and second data objects are contained in the first and second backups, respectively.

2. The method of claim 1:
   wherein the catalog contains a first entry indicating that a most recent backup copy of the first data object existing at the time the second backup was created, is contained in the first backup;
   wherein the catalog contains a second entry indicating that a most recent backup copy of the second data object existing at the time the second backup was created, is contained in the second backup.

3. The method of claim 2 further comprising:
   storing the first catalog on a storage device that stores the first backup set;
   storing the second catalog on a storage device that stores the second backup set.

4. A method comprising:
   creating a full backup set and an incremental backup set of a data volume, wherein the data volume comprises n data objects;
   creating first and second backup catalogs corresponding to the full and incremental backup sets, respectively, wherein each of the first and second backup catalogs comprises n entries corresponding to the n data objects, respectively.

5. The method of claim 4 wherein each entry of the second backup catalog contains a backup identification (ID) identifying the full backup set or the incremental backup set, wherein first and second backup IDs of first and second entries, respectively, of the second backup catalog each backup identify the full and incremental backup sets, respectively.

6. A method comprising:
   creating a full backup of a data volume, wherein the data volume comprises n data objects;
   creating an incremental backup of the data volume after modification of one of the data objects in the data volume;
   creating a first backup catalog corresponding to the full backup;
   creating a second backup catalog corresponding to the incremental backup, wherein the incremental backup catalog is created as a function of the full backup catalog.

7. A computer readable medium storing instructions executable by a computer system, wherein the computer system implements a method in response to executing the instructions, the method comprising:
   creating a first backup of a data volume, wherein the data volume comprises first and second data objects;

creating a second backup of the data volume after modification of the second data object but before modification of the first data object;

creating a catalog after modification of the second data object but before modification of the first data object, wherein the catalog contains information indicating that backup copies of the first and second data objects are contained in the first and second backups, respectively.

8. The computer readable medium of claim 7 wherein the catalog contains a first entry indicating that a most recent backup copy of the first data object existing at the time the second backup was created, is contained in the first backup;

wherein the catalog contains a second entry indicating that a most recent backup copy of the second data object existing at the time the second backup was created, is contained in the second backup.

9. The computer readable medium of claim 7 wherein the method further comprises:

storing the first catalog on a storage device that stores the first backup set;

storing the second catalog on a storage device that stores the second backup set.

10. A computer readable medium storing instructions executable by a computer system, wherein the computer system implements a method in response to executing the instructions, the method comprising:

creating a full backup set and an incremental backup set of a data volume, wherein the data volume comprises n data objects;

creating first and second backup catalogs corresponding to the full and incremental backup sets, respectively, wherein each of the first and second backup catalogs comprises n entries corresponding to the n data objects, respectively.

11. The computer readable medium of claim 10 wherein each entry of the second backup catalog contains a backup identification (ID) identifying the full backup set or the incremental backup set, wherein first and second backup IDs of first and second entries, respectively, of the second backup catalog each backup identify the full and incremental backup sets, respectively.

12. A computer readable medium storing instructions executable by a computer system, wherein the computer system implements a method in response to executing the instructions, the method comprising:

creating a full backup of a data volume, wherein the data volume comprises n data objects;

creating an incremental backup of the data volume after modification of one of the data objects in the data volume;

creating a first backup catalog corresponding to the full backup;

creating a second backup catalog corresponding to the incremental backup, wherein the incremental backup catalog is created as a function of the full backup catalog.

* * * * *